United States Patent
Cerda-Vilaplana et al.

(10) Patent No.: US 6,170,656 B1
(45) Date of Patent: Jan. 9, 2001

(54) CASE FOR DIGITAL VIDEO DISCS, COMPACT DISCS AND THE LIKE WITH IMPROVED DISC HOLD AND RELEASE DEVICE

(75) Inventors: Gustavo Cerda-Vilaplana; Ruben Cerda-Torres, both of Ibi (ES)

(73) Assignee: Magnetic Imatge, S.A. (ES)

( * ) Notice: Under 35 U.S.C. 154(b), the term of this patent shall be extended for 0 days.

(21) Appl. No.: 09/402,914
(22) PCT Filed: Jan. 18, 1999
(86) PCT No.: PCT/ES99/00012
  § 371 Date: Oct. 13, 1999
  § 102(e) Date: Oct. 13, 1999
(87) PCT Pub. No.: WO99/43001
  PCT Pub. Date: Aug. 26, 1999

(30) Foreign Application Priority Data

Feb. 17, 1998 (ES) ................................. 9800449 U

(51) Int. Cl.⁷ .................................................. B65D 85/57
(52) U.S. Cl. .......................................... 206/308.1; 206/310
(58) Field of Search ................. 206/303, 308.1, 206/310, 493

(56) References Cited

U.S. PATENT DOCUMENTS

| | | | |
|---|---|---|---|
| 5,626,225 | * | 5/1997 | Joyce, Jr. ........................ 206/308.1 |
| 5,660,274 | * | 8/1997 | Chien .............................. 206/308.1 |
| 5,685,425 | * | 11/1997 | Choi ................................ 206/310 |
| 5,685,427 | * | 11/1997 | Kuitems et al. .................. 206/310 |
| 5,829,582 | * | 11/1998 | Ippolito et al. ................. 206/308.1 |
| 5,896,986 | * | 4/1999 | Bolognia et al. ................ 206/310 |

FOREIGN PATENT DOCUMENTS

97/41563 * 11/1997 (WO) .

* cited by examiner

*Primary Examiner*—Jim Foster
(74) *Attorney, Agent, or Firm*—Adams, Schwartz & Evans, P.A.

(57) ABSTRACT

The invention relates to a case having a bottom wall (1) with a cylindrical protuberance (2) on the upper face (2a) of which is formed a button (3) with holding teeth (5) for nesting and releasing a DVD type disc through its central orifice. Flexible side branches (4) are provided between said button (3) and the upper surface (2a). According to the invention, each flexible branch has a first portion (4a) at right angle and second portion (4b) which extends slightly inclined and forming an angle (B) with said upper surface (2a) which does not exceed 30°; the first portion (4a) has U-shaped notch (4c) at the vicinity of the button (3).

1 Claim, 2 Drawing Sheets

A-A

CASE FOR DIGITAL VIDEO DISCS, COMPACT DISCS AND THE LIKE WITH IMPROVED DISC HOLD AND RELEASE DEVICE

The present invention refers to a case for magnetic recording supports disc-shaped in formats such as digital video discs (DVD) or compact discs (CD) and the like that have an improved disc hold/release device.

Diverse cases of this type are known at the moment, the most known up to now being the CD cases for audio and data and software.

According to the state of the art, these cases include in their central part a projecting formation for a fitted or firm holding of the disc through its central orifice. This projecting formation is biased by compression, so that the disc can be released from its fitted holding, by exercising a pressure on the said projection.

As will be understood by the skilled in the art, a projecting formation according to the above said has a structure that is perfectly adapted to be manufactured in molding processes of the plastic materials that make up the walls of the case in an integral way with said walls.

Through ES-U-9800126 also in the name of the applicant, known is a case of this type where a pulse button with some L-shaped side branches is provided, as well as some holding teeth with pointed form with entry and exit angles with different and appropriate inclinations to obtain the release of the disc in cooperation with some circumferential projections for the support of the external edge in a slightly flexed mode in a radial direction.

According to diverse tests, the applicant has reached the conclusion that a configuration in L-shape of the side branches as is described in the prior art, has as a disadvantage that the areas for connection or transition of the side branches and the bottom wall of the case, may present after a specific number of taps on the button, plastic deformations, that is to say a non-recovery of the material, so that after a prolonged use the operation of the holding and releasing device may be damaged.

The purpose of the present invention is to develop a device of the type above said that allows solving the said disadvantage in order to obtain a lasting and safe-usage device.

This task is reached from a case according to the preamble of the first claim, and in which, according to the invention, the side branches that connect the button to the bottom wall of the case have a first portion at the vicinity of the button, generally at a right angle and a second portion that extends to the bottom wall of the case forming an acute angle with it lower than 30°.

With this simple measure, the material of the side branches in the above said areas for transition or connection to the button and bottom wall, do not undergo permanent plastic deformations that damage the long-lasting operation.

Other characteristics and advantages of the invention will be clearer from the following description carried out with the help of the attached drawings applicable to non-limiting execution examples and where:

Figure 1:
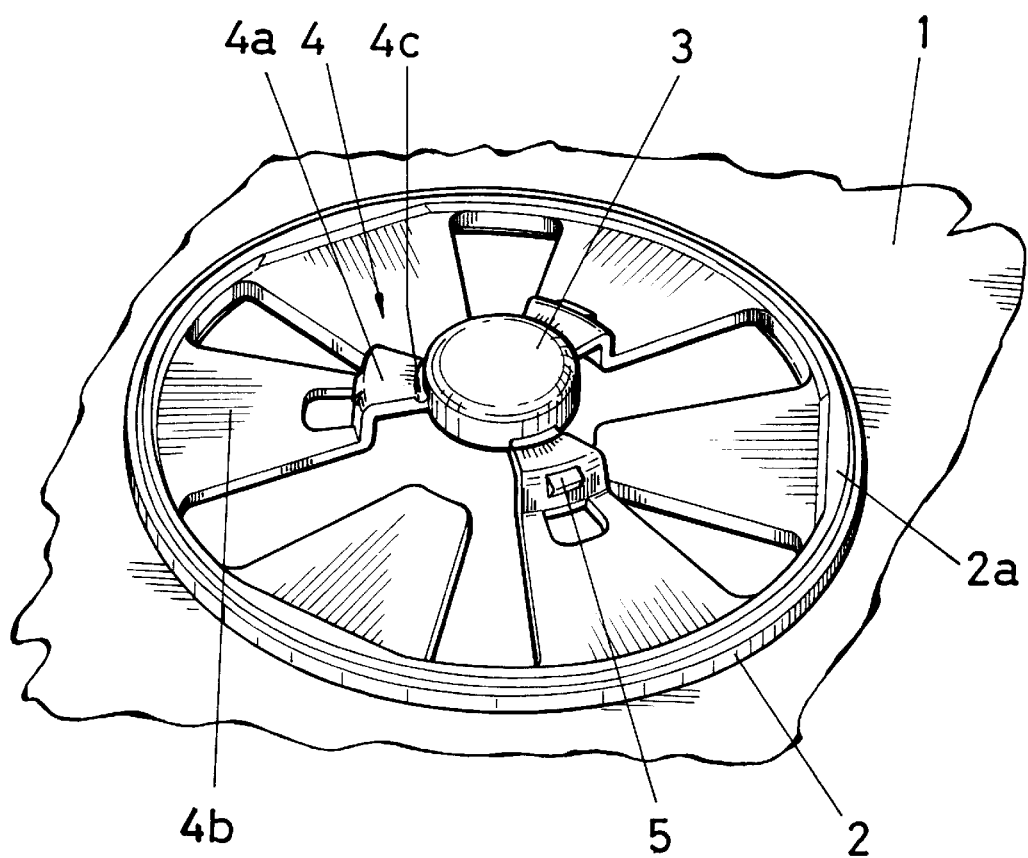
FIG. 1 illustrates an enlarged view in perspective of the device for holding and releasing the disk according to the invention.
Figure 2:
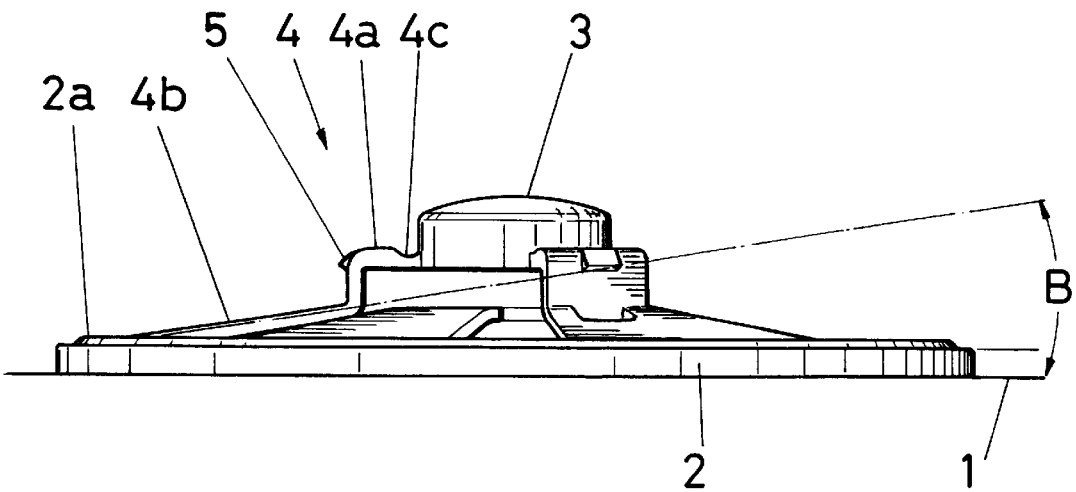
FIG. 2 illustrates an enlarged raised side view of the device according to the invention.
Figure 3:
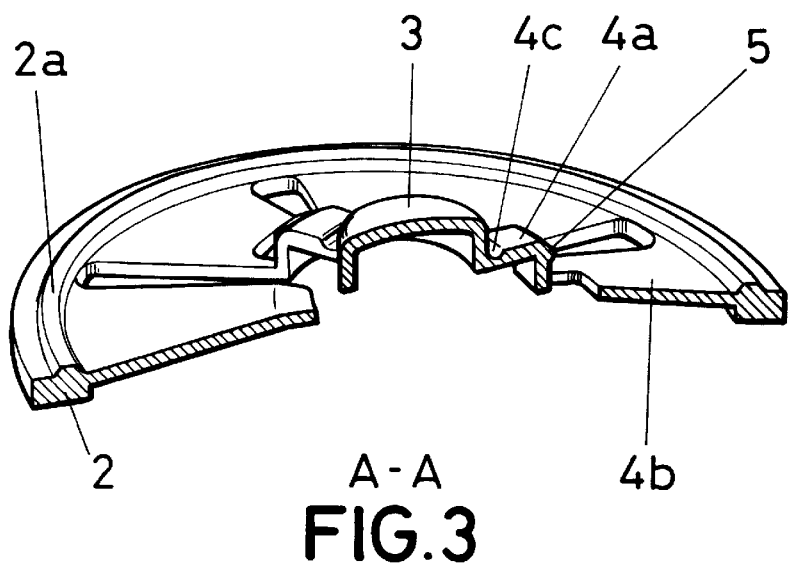
FIG. 3 shows a section view of the top part of the device of the invention.

A case for DVD type discs and the like of which only the bottom wall 1 is represented, is configures as is described in the above said Spanish utility model application similar to a case for video tapes, that is to say with bindings or covers joined around a central portion or body, some circumferential projections (not shown) also being configured in such bottom wall to support the edge or external periphery of the disc with the purpose thereby described.

As is well-known, in the bottom wall 1, configured is a protuberance 2 with an upper surface 2a where a button 3 is formed with some holding teeth 5 in pointed form with surfaces for entry and exit adequately inclined to ease the hold, as well as the release of the disc in conjunction with a circumferential projection (not shown) of the bottom wall 1 where lying supported with a slightly radial flexion is the compact disc or similar and some side branches 4 provided between the said button 3 and bottom wall 1.

According to the invention, the said side branches 4 that extend between the button 3 and the upper surface 2a of the said cylindrical protuberance 2, have a first portion 4a, at the vicinity of button 3, at a right angle with a U-shaped notch 4c and a second portion 4b that extends between said first portion and the upper surface 2a of the cylindrical protuberance 2, forming with it an angle B which does not exceed 30°.

With this simple measure, the flexion behavior of the said side branches is notably improved, so that in the material of the same, permanent deformations are not produced or are produced in a smaller measure, specially in the areas of transition with the bottom wall 1 where the requisitions for flexion are greater.

As will be easily understood by the skilled in the art, this device has a structure that is specially appropriate to be configured in molding processes for plastic material integrally with the bottom wall of a case in a box shape.

As such object of the invention has been sufficiently described, the only thing left is to indicate that the resulting embodiments of changes in material, structure, dimensions or similar, as well as those derived from an application of routine from the previously exposed must be considered included in its boundary, so that the invention will only be limited by the scope of the following claims.

What is claimed is:

1. In a case for storing a digital media laser disk having upper and lower faces and an inner edge defining a central circular opening, the case including a floor positioned within a frame, the improvement comprising a raised seat on a central location on the floor, said seat adapted for releasably engaging the inner edge of the circular opening of the disk, the improvement comprising:

(a) an outer cylindrical rim connected to the floor and including an inner and an outer sidewall, said outer sidewall having a diameter between two and two and one half times the diameter of the central opening of the disk;

(b) a centrally located cylindrical button positioned above the horizontal plane of said rim and including a sidewall having upper and lower edges, and an upper face having an outer edge connected to said upper edge, said button movable toward the floor in response to downward pressure on said face for releasing the disk from the seat;

(c) a plurality of flexible planar branches extending radially outwardly and slanting downwardly away from said button for being raised and lowered between two angles responsive to downward pressure on the face of the button, each of said branches including an upper horizontal surface connected by a hinge to said lower edge of the sidewall of the button and a lower horizontal surface connected to said inner sidewall of said rim;

(d) a vertical face having first and second ends interconnecting said upper and lower horizontal surfaces, respectively, and including a wedge-shaped notch thereon for engaging the inner edge of the opening of the disk in the absence of downward pressure on the face of the button, and releasing the inner edge in the presence of downward pressure on the face of the button; and (e) a plurality of trapezoidally-shaped planar arms positioned in alternating sequence with said branches, each of said arms including a first end connected to the inner sidewall of said rim and a second free end extending inwardly toward the button for supporting the lower face of the disk.

* * * * *